L. J. HALL.
MACHINE FOR STAMPING AND SEALING MAIL MATTER.
APPLICATION FILED JUNE 13, 1903.
1,132,929.
Patented Mar. 23, 1915.
12 SHEETS—SHEET 1.
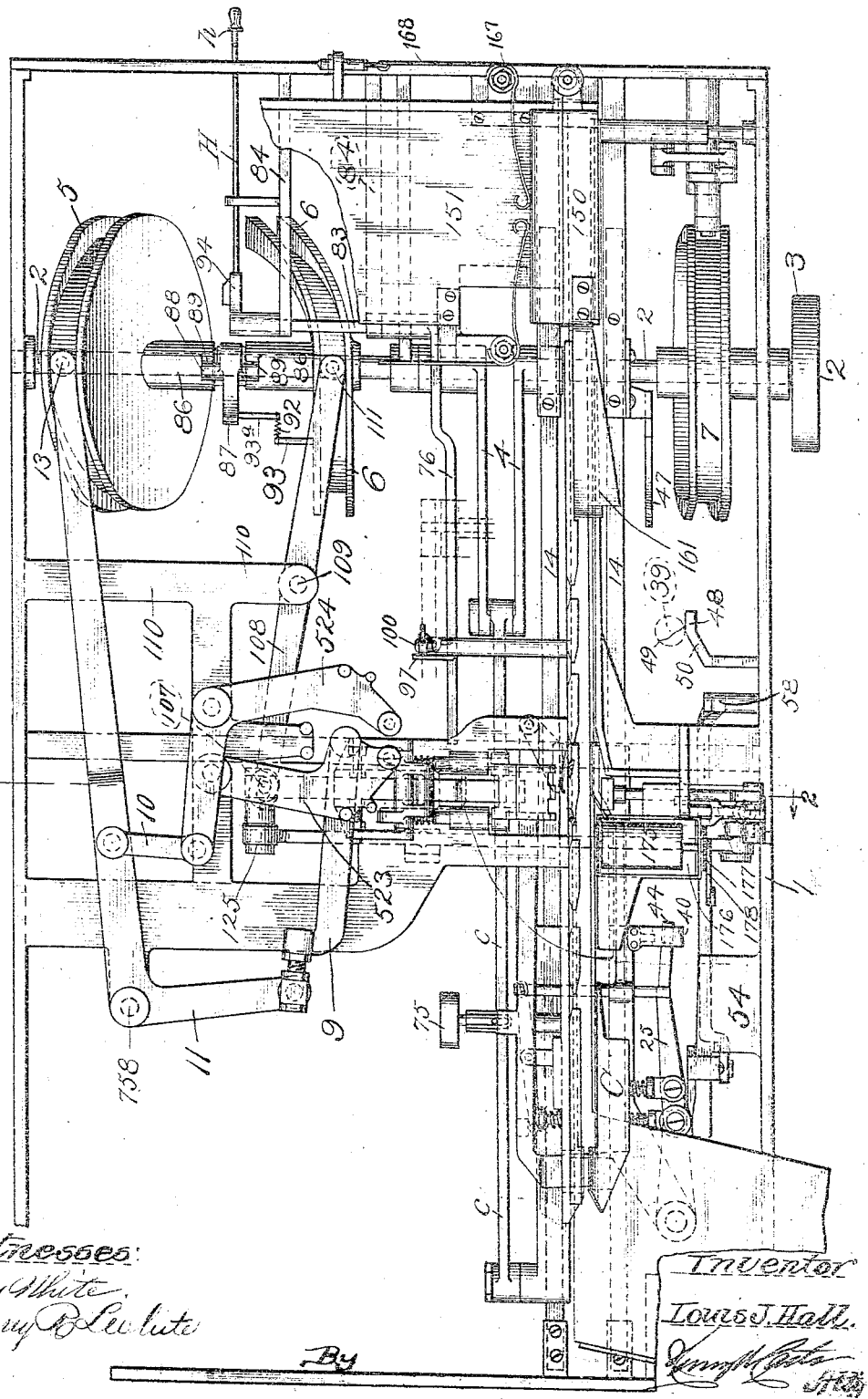
Witnesses:
Ray White
Harry R. Leclute
Inventor
Louis J. Hall.
By

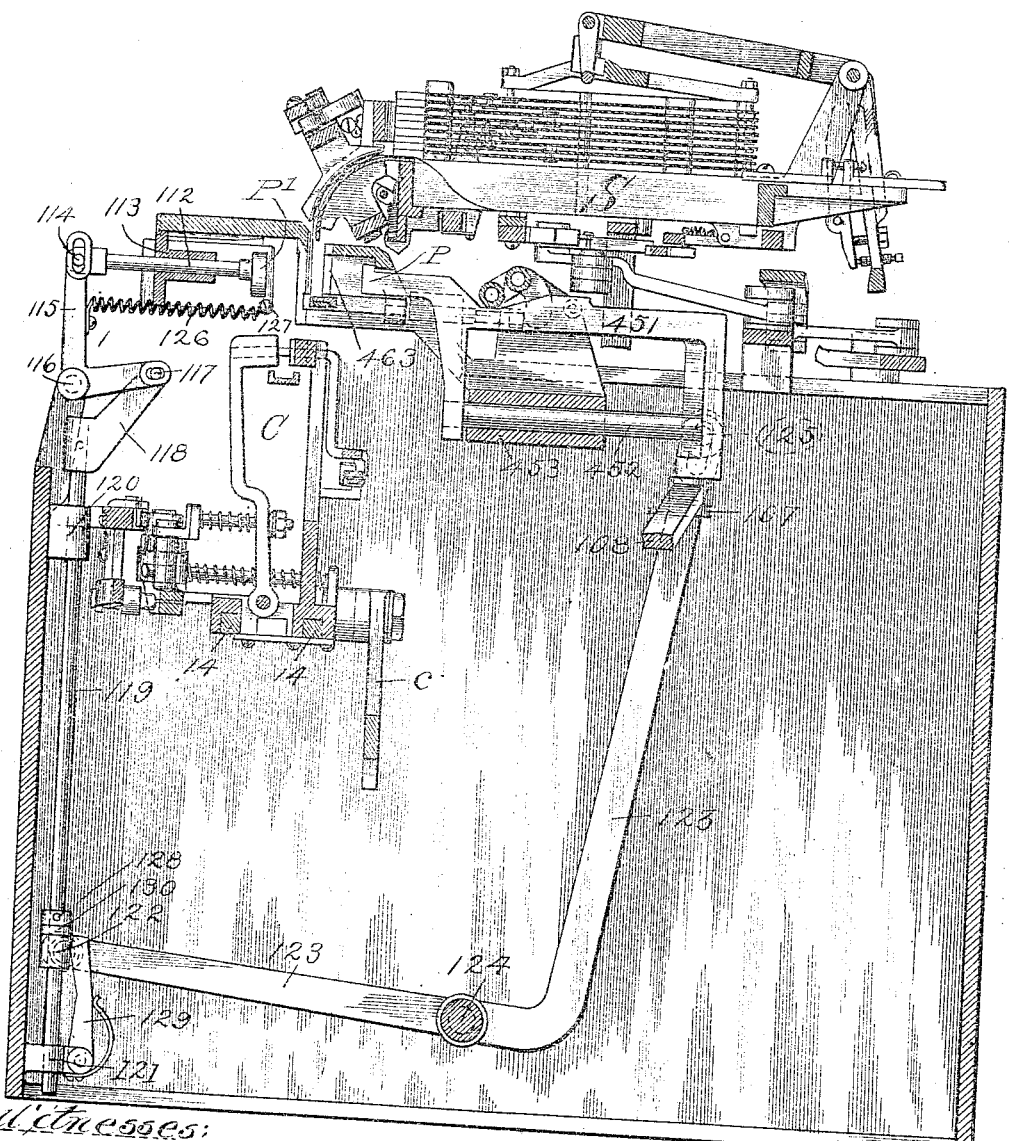

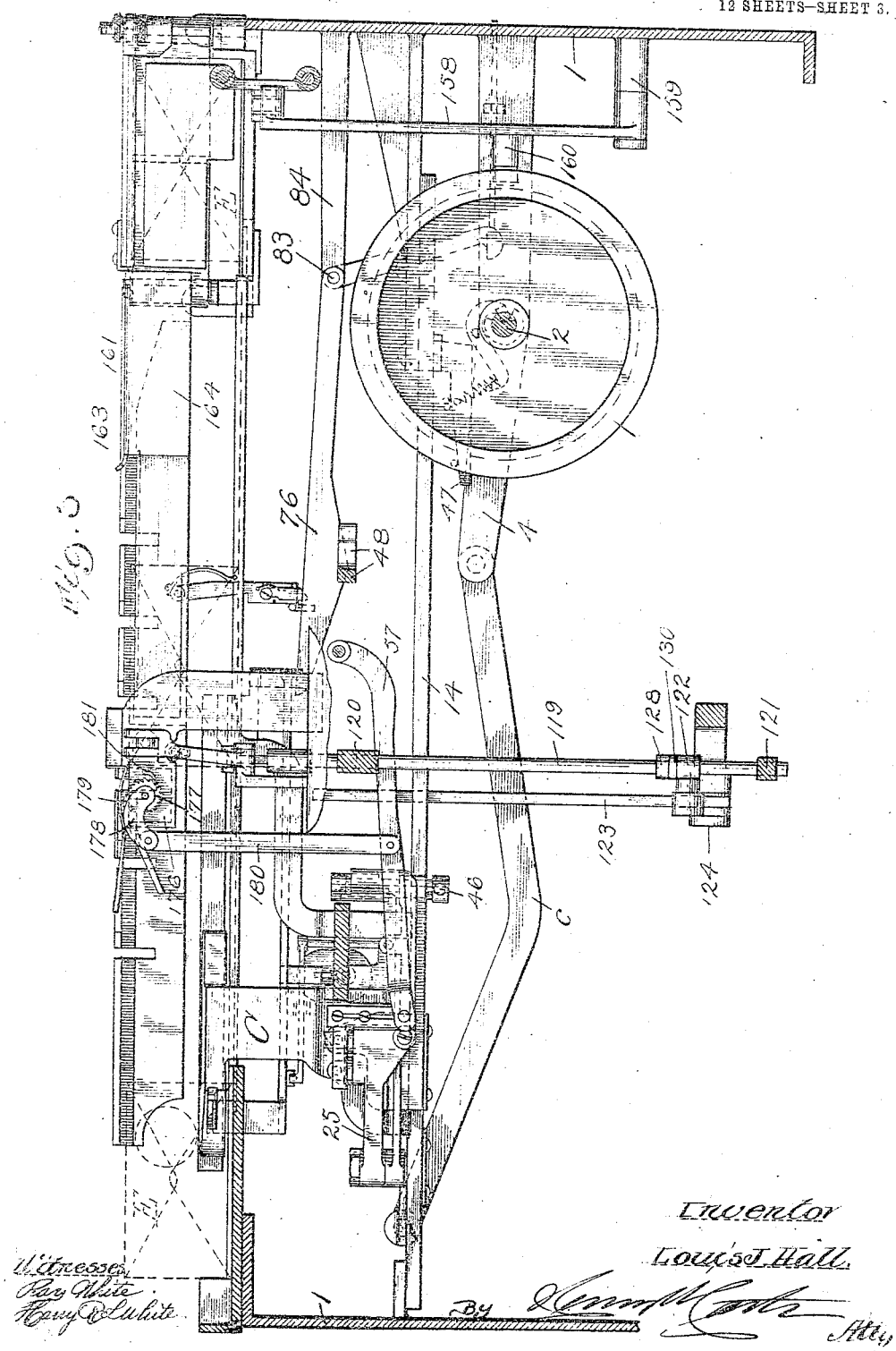

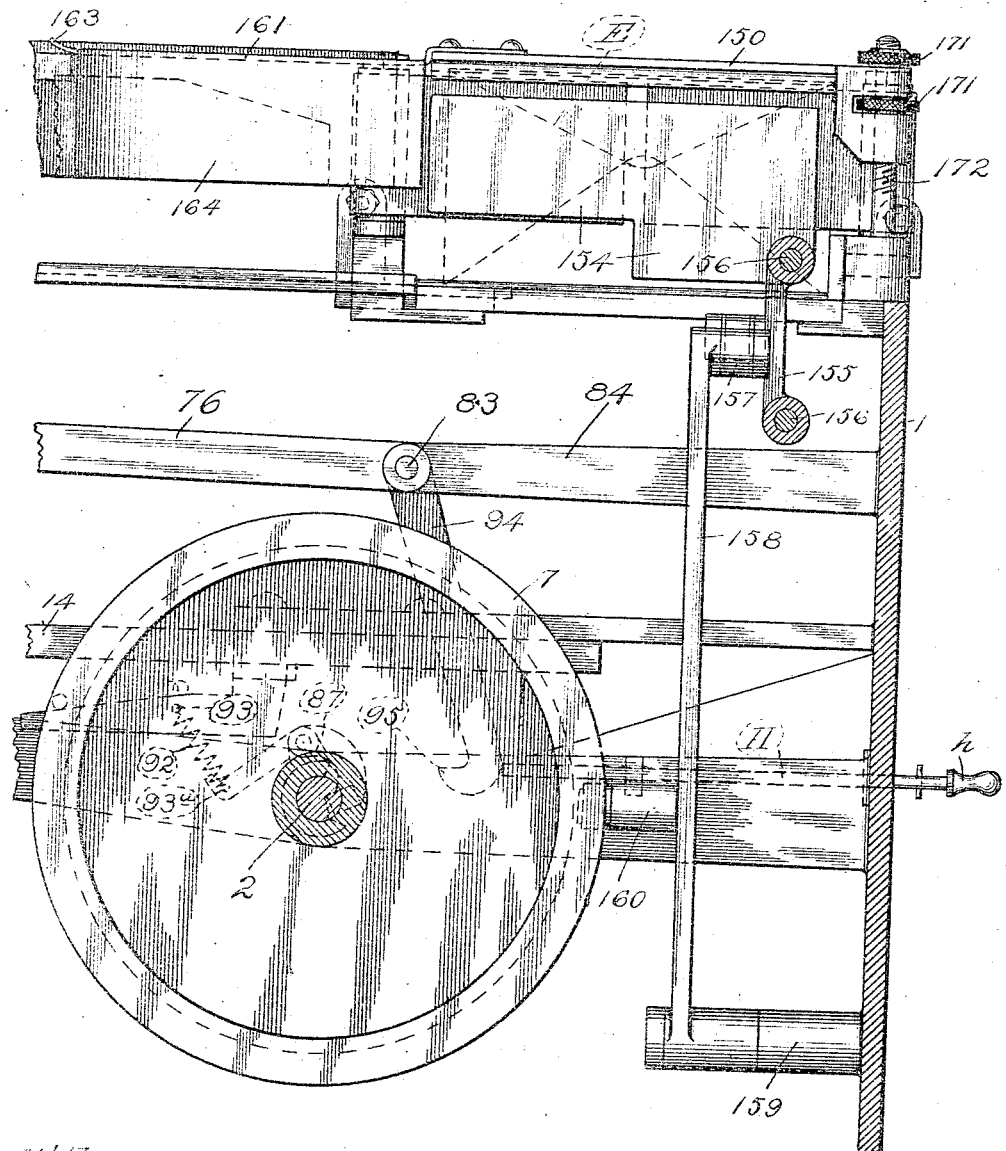

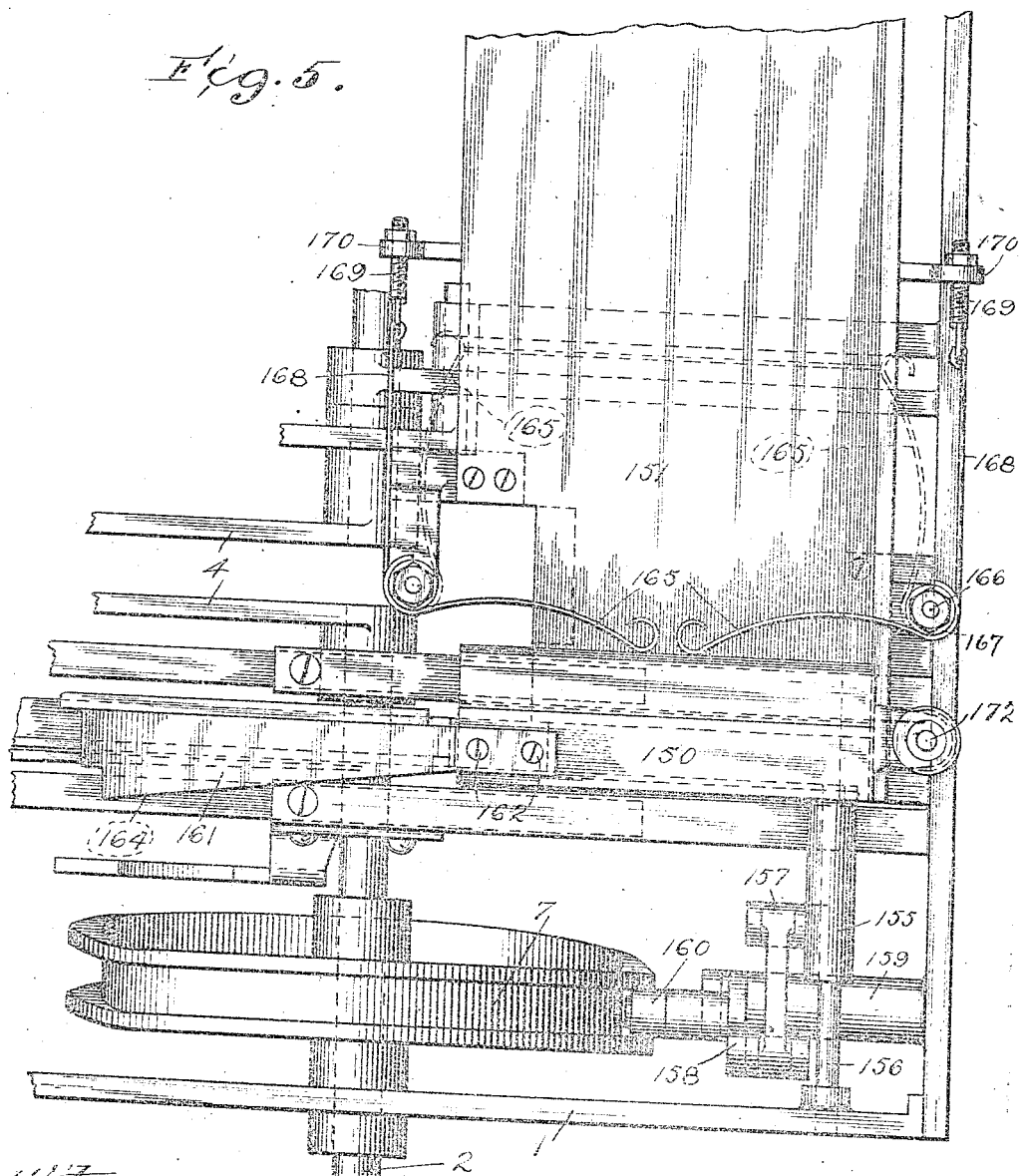

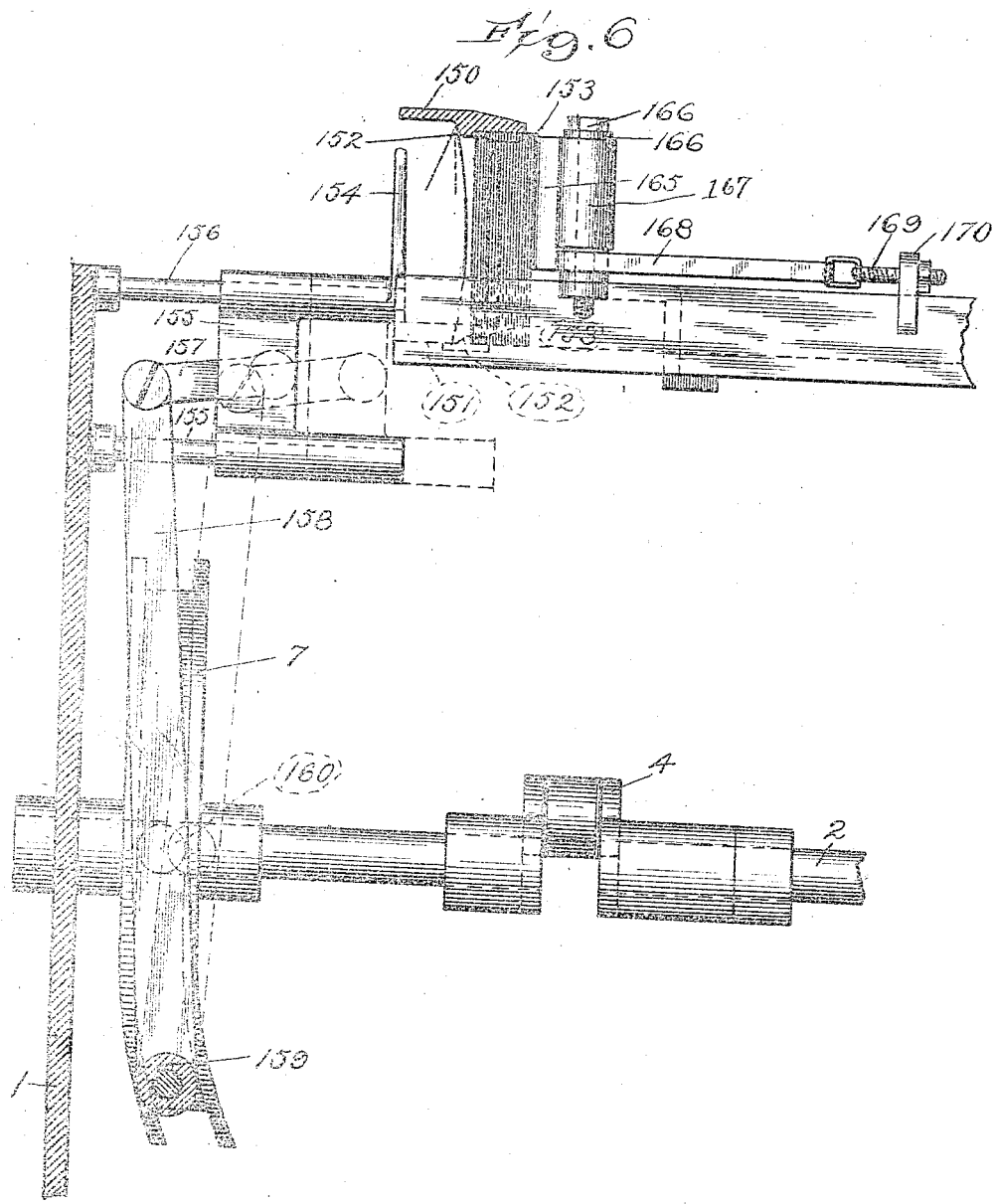

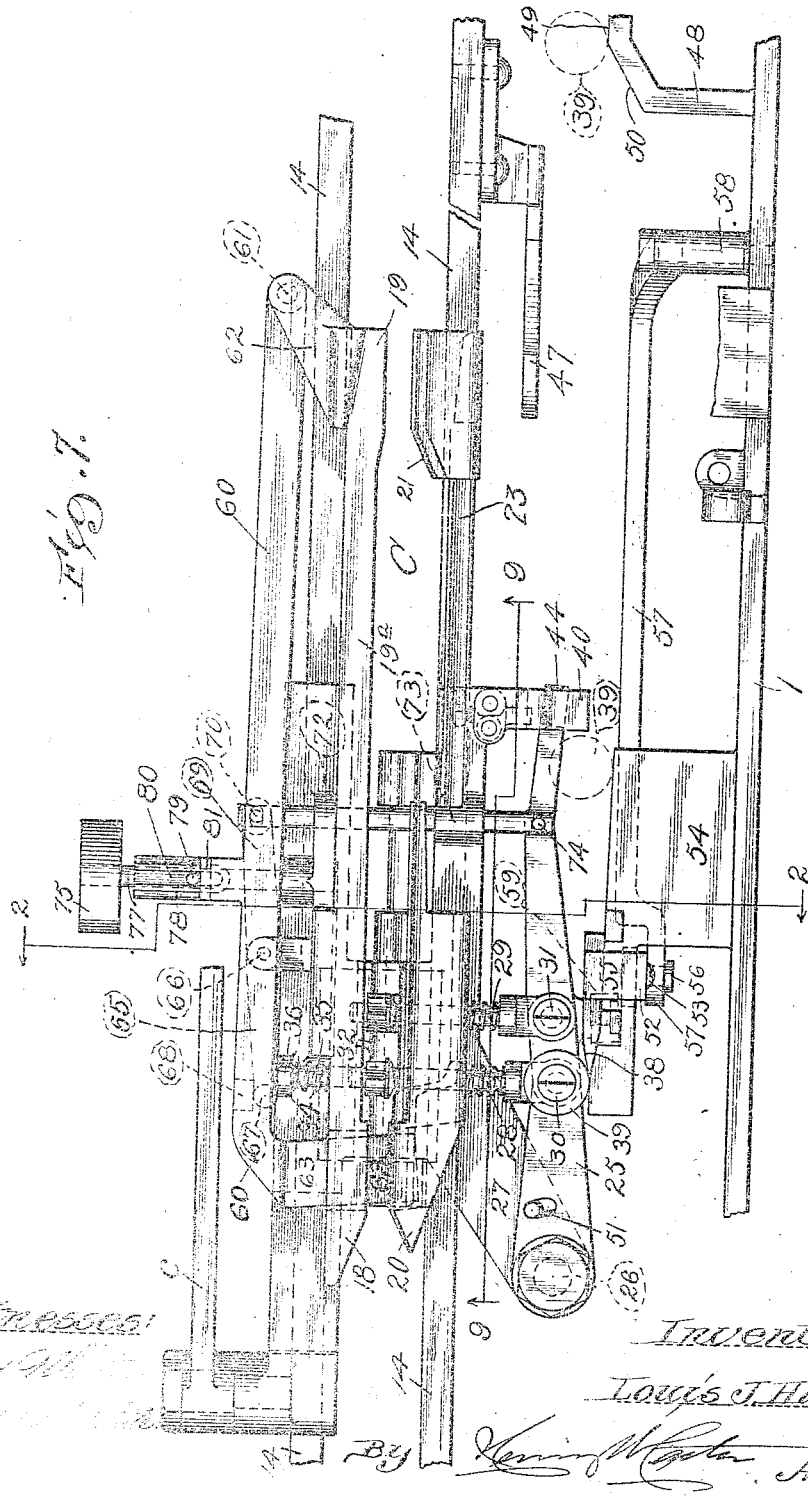

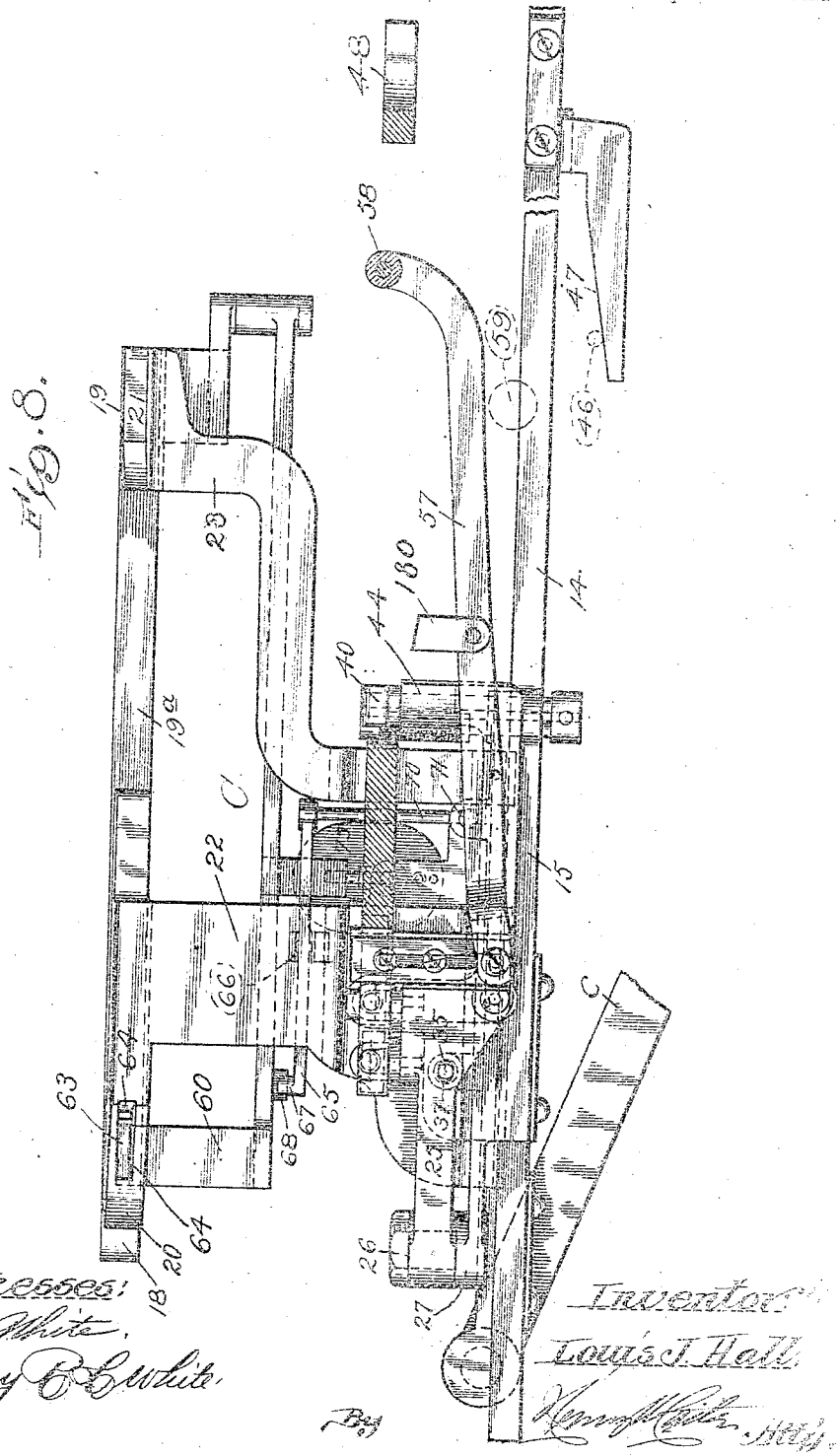

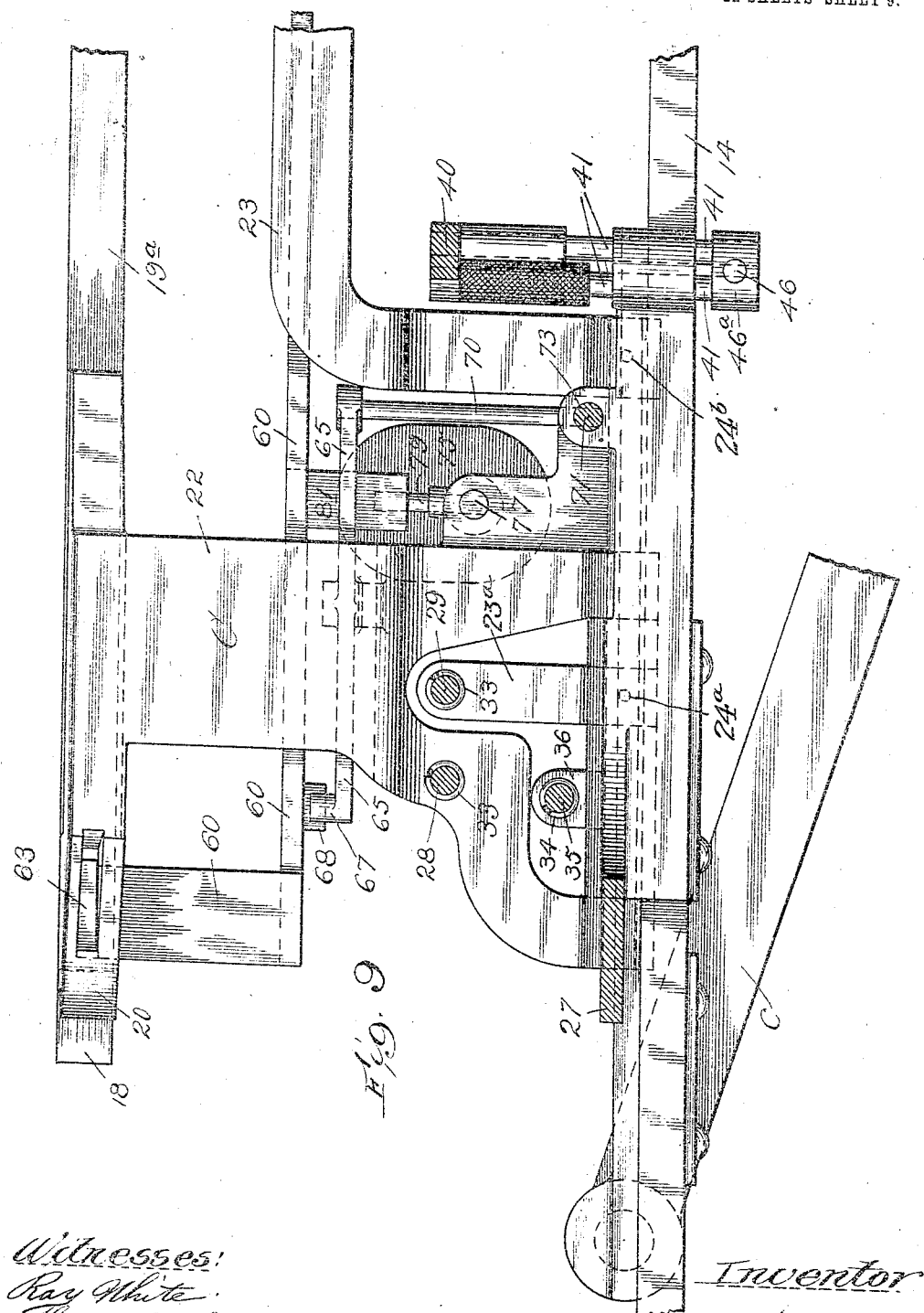

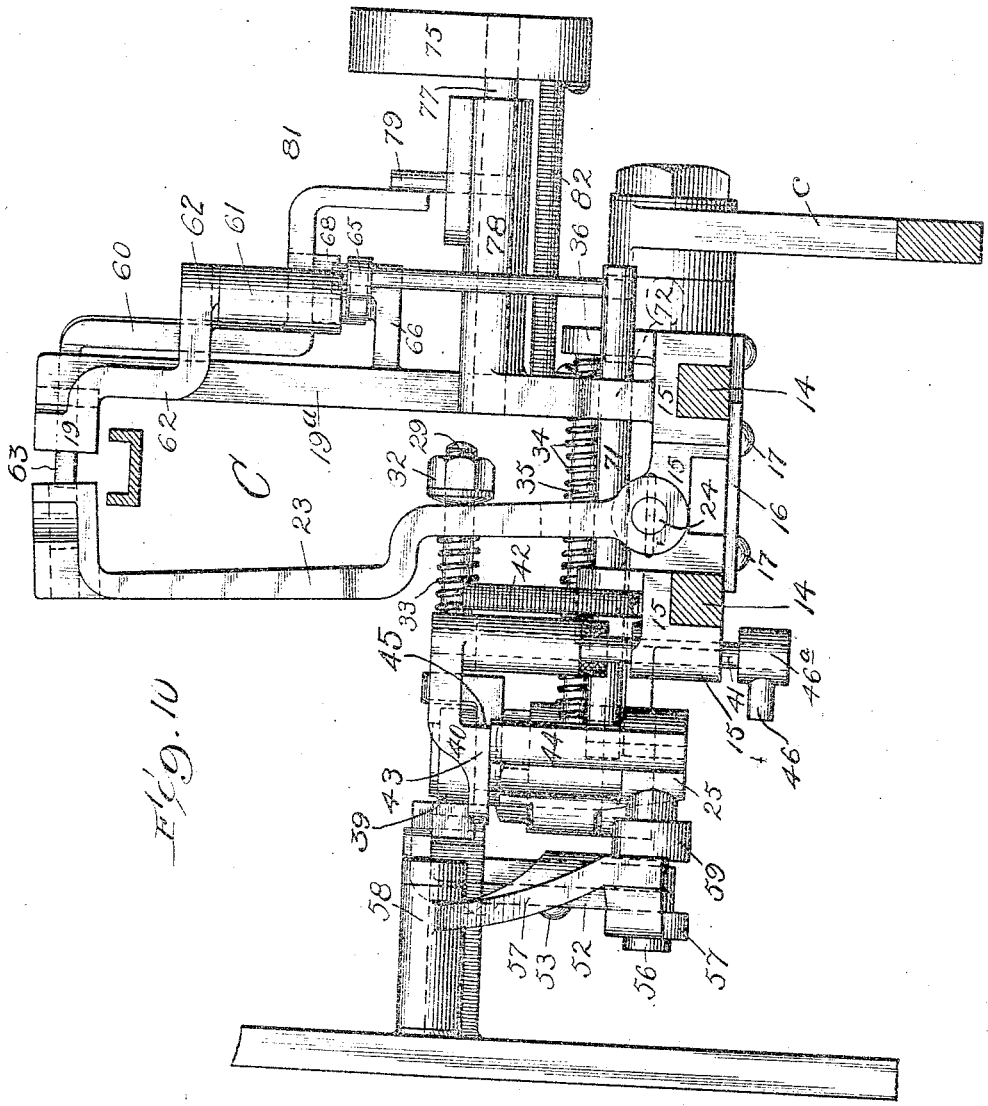

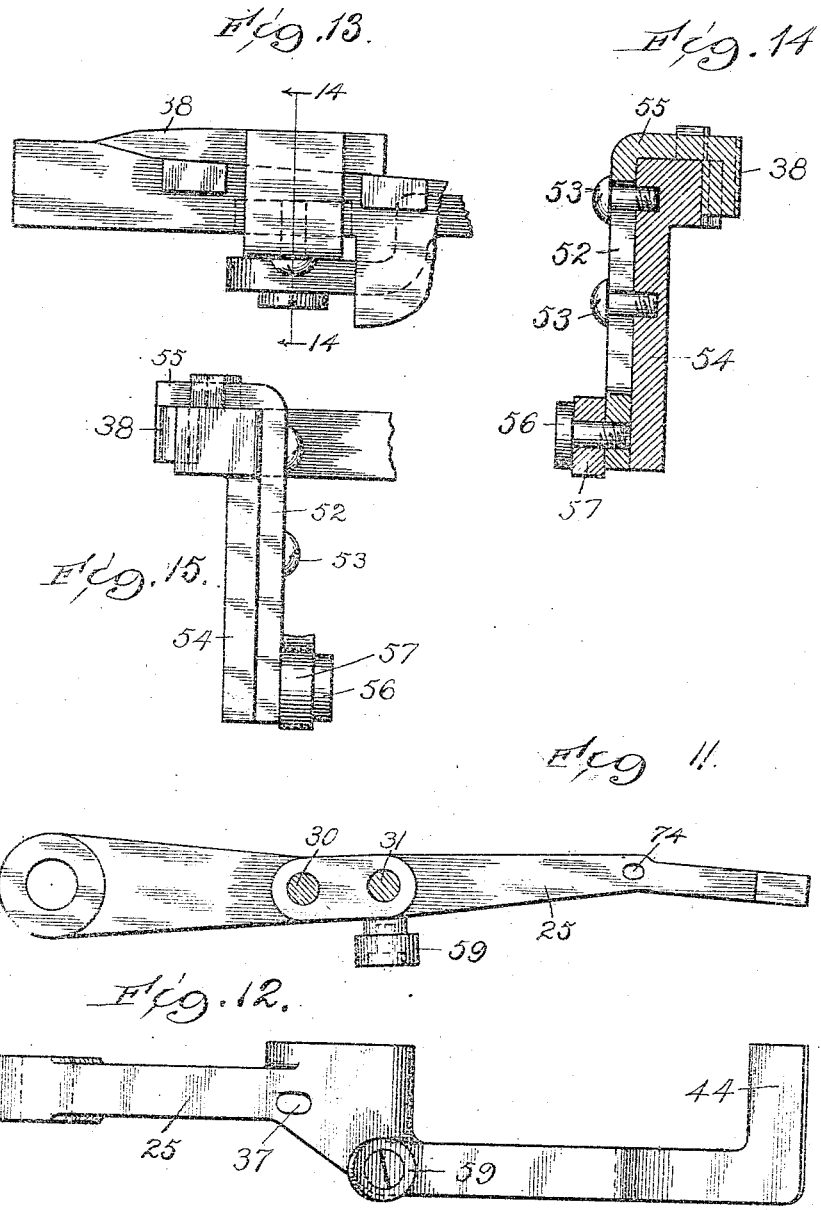

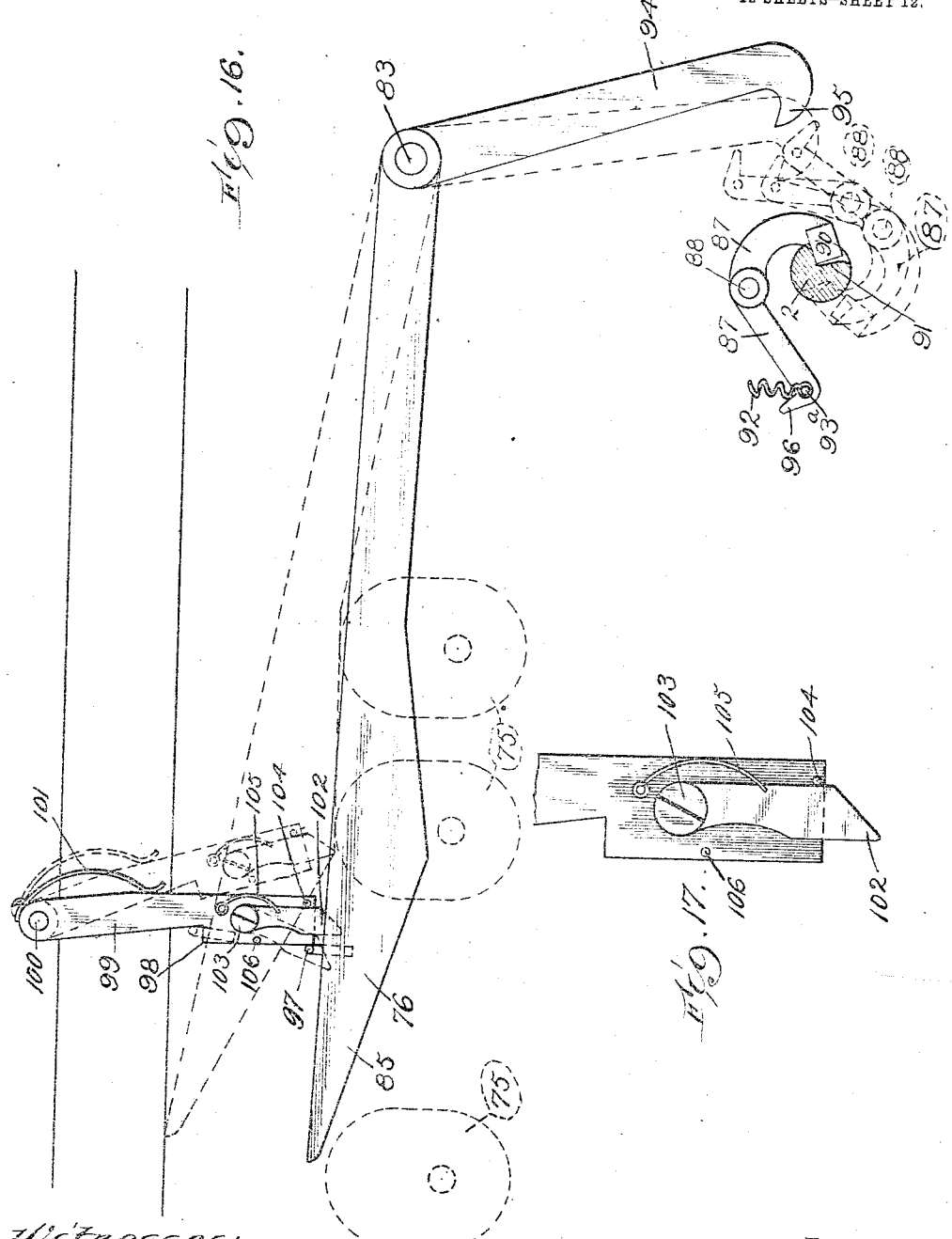

UNITED STATES PATENT OFFICE.

LOUIS J. HALL, OF CHICAGO, ILLINOIS, ASSIGNOR, BY MESNE ASSIGNMENTS, TO MORRIS-HALL MAIL CLOSER CO., A CORPORATION OF DELAWARE.

MACHINE FOR STAMPING AND SEALING MAIL-MATTER.

1,132,929. Specification of Letters Patent. Patented Mar. 23, 1915.

Application filed June 13, 1903. Serial No. 161,280.

*To all whom it may concern:*

Be it known that I, LOUIS J. HALL, a citizen of the United States, residing at Chicago, in the county of Cook and State of Illinois, have invented certain new and useful Improvements in Machines for Stamping and Sealing Mail-Matter, of which the following is a specification.

This invention relates to machines for stamping and sealing mail matter and for other similar purposes, and more particularly contemplates various improvements upon and additions to the mechanisms disclosed in the prior applications made jointly by Edward C. Morris and myself, No. 653,832, filed October 2, 1897, which resulted in Patent No. 884,338, dated April 14, 1908, and No. 691,321, filed September 19, 1898, which resulted in Patent No. 884,837, dated April 14, 1908, and in my prior application No. 715,042, filed April 29, 1899, which resulted in Patent No. 870,359, dated Nov. 5, 1907.

The object of the invention is to provide an improved construction in machines of the character referred to, and it consists in the matters hereinafter set forth and particularly pointed out in the appended claims.

In the accompanying drawings illustrative of a machine embodying my improvements in one form,—Figure 1 is a top plan view of the mechanism, with the stamp carriage and certain of its operating connections removed. Fig. 2 is a transverse sectional elevation taken on line 2—2 of Figs. 1 and 7, and showing the stamp carrage in place. Fig. 3 is a sectional front elevation taken just inside of the front frame of the machine. Fig. 4 is a front detail of the sealer enlarged from Fig. 3. Fig. 5 is a top plan detail thereof. Fig. 6 is an enlarged end elevation thereof. Fig. 7 is an enlarged top plan detail of the carrier. Fig. 8 is a detailed front elevation thereof enlarged from Fig. 3. Fig. 9 is a similar view taken on line 9—9 of Fig. 7. Fig. 10 is a detailed end elevation thereof. Fig. 11 is an enlarged top plan detail of the lever which opens and closes the carrier jaws. Fig. 12 is a similar front elevation thereof. Fig. 13 is an enlarged top plan detail of the cam mechanism and the frame which controls this lever. Fig. 14 is a sectional detail thereof taken on line 14—14 of Fig. 13, looking from the right. Fig. 15 is an end elevation thereof, looking from the left. Fig. 16 is a diagrammatic front elevation enlarged from Fig. 3 of the bell cra k and latching device of the automatic stop mechanism. Fig. 17 is an enlarged detail of the lower end of the latching lever.

The supporting frame work 1 of the machine thus illustrated is desirably and herein shown as made of metal plates which also serve to form a protecting inclosure for the mechanism. Extending across this frame work from front to rear and transversely of its length. is the main drive shaft 2, one end of which projects through the front frame plate to carry a driving connection or pulley 3, by which it may be rotated from any suitable source of power. This driving shaft is formed with a crank 4 by which the carrier C is reciprocated, and supports and drives the cams 5 and 6 that transmit motion to the stamp carriage and affixing mechanism, as well as the cam 7 which gives movement to the sealer.

The stamp carriage S herein shown (Fig. 2), is of the same construction as that disclosed in my previous application No. 715,042, which resulted in Patent No. 870,359, dated November 5, 1907, hereinbefore referred to, and it is contemplated that this carriage shall be given its step by step reciprocatory movement by the same character of vibratory levers 523 and 524 as therein set forth. Instead, however, of these vibratory levers being operated by direct engagement with a rotating cam, as in said prior application, they are shown herein as vibrated by links 9 and 10 from a bell crank lever 11, which is pivoted to the machine frame at 758, and is provided at one end with a stud or anti-friction roller 13 that enters a groove in the cam 5. In all other respects the construction of the stamp carriage and its actuating mechanism may be identical with that shown in said prior application, and forms no part of my present improvements.

*Carrier mechanism.*—The carrier C, which transfers the envelops first from the magazine to a position in front of the affixing mechanism, and then from this latter position to the stacker, is herein shown as mounted to slide upon a pair of guide rods 14 which extend longitudinally of the machine parallel to its front plate 1 (Figs. 7, 8, 9, and 10). The base plate 15 of the carrier is grooved to fit over the rods 14, and is provided on its under surface with a strap 16, which is removably secured to the carrier base by screws 17, and the ends of which project beneath the guide rods and prevent the carrier from being lifted from them. The carrier is actuated from the crank 4 on the main driving shaft by a pitman c, and makes one full reciprocation back and forth with each revolution of said shaft.

The jaws 18 and 19 of the carrier on the back side of the path of the envelop are formed at the upper edge of a rigid bracket 19$^a$, that rises from the base plate 15 of the carrier. Opposed to these rigid jaws 18 and 19, are two movable jaws 20 and 21, respectively, which are carried upon the upper ends of vibratory arms 22 and 23 (Fig. 8), that are independent of each other but are both pivoted to the base plate 15 of the carrier by a common pivot or shaft 24 (Fig. 10). The carrier is thus provided in effect with two pairs of opposing jaws, 18—20 and 19—21, respectively. And in the operation of the machine, the jaws 18—20, at one end of the carrier, enter the magazine and pull the envelop to a position in front of the stamp affixing mechanism in one reciprocation of the carrier, while the jaws 19—21 at its other end seize the rear end of the same envelop and push it from the stamp affixing mechanism into the sealer in the next reciprocation of the carrier.

The opening and closing of the carrier jaws is accomplished by a lever 25 which is pivoted at 26 to a bracket 27 that projects forwardly and laterally from the base 15 of the carrier near its left hand end (Fig. 7). This lever 25 actuates the two vibratory jaw arms 22 and 23 through links 28 and 29. The link 28 leads directly from the lever 25 to the jaw arm 22. The link 29 leads from the lever 25 to a rigid arm 23$^a$, which is keyed or pinned at 24$^a$ to the pivot rod or shaft 24, and, the jaw arm 23 being also rigidly keyed or pinned at 24$^b$ to the pivot rod or shaft 24, is thus caused to vibrate by action of the link 29 on the arm 23$^a$, in exactly the same manner as though directly engaged by said link. The two links 28 and 29 are pivotally secured to the lever 25 by screws 30 and 31, respectively, and extend loosely through holes in the jaw arm 22 and rigid arm 23$^a$, and are provided at their inner ends with adjustable nuts 32 which engage the inner faces of the arms. Springs 33 are then inserted upon the links between the lever 25 and the jaw arms so that as the lever 25 is swung outwardly and forwardly on its pivot, the jaws are positively pulled open by the nuts 32, while when the lever 25 is swung rearwardly or inwardly upon its pivot, the jaws are yieldingly closed by the pressure of the springs 33 upon said links 28 and 29.

The lever 25 is normally maintained under pressure tending to swing it outwardly to open the jaws, by means of a spring 34 which is mounted upon a rod 35 that projects forwardly from a lug 36 on the carrier base 15 (Figs. 9 and 10), the free forward end of this rod 35 being arranged to pass loosely through a slot 37 in the lever 25 (Fig. 12), and the spring 34 being compressed between the lug 36 and the inner side of said lever. The swinging in of the lever against the pressure of this spring 34 is accomplished by a stationary cam 38 (Fig. 7), over which an anti-friction roller 39 on the lever travels as the carrier starts on its movement away from the magazine. As herein shown this roller is secured to the lever by the same screw 30 which pivotally connects the lever with the link 28, and in Fig. 7 this roller is just beginning to ride up on the cam 38 in the outward travel of the carrier from the magazine.

As soon as the jaws are once closed by the action of the cam 38, they are locked in closed position by a latch 40 (Figs. 7 and 10), located at the right hand front corner of the base plate 15 of the carrier. The latch itself is carried at the upper end of a pair of guide pins 41, which are mounted to slide vertically through apertures in the subjacent corner of the base plate 15, and both the latch and its guide pins are normally pulled downward by a spring 42 stretched between the latch and the base plate (Fig. 10). When the lever 25 is swung out and the carrier jaws are open, the tip 43 of the latch rests upon the top of th extreme forward end 44 of the lever and is thereby held up in raised position and is inoperative. But when the lever 25 is swung in to close the jaws, its extremity 44 moves in beneath a notch 45 in the latch which thereupon immediately drops down over the lever and locks it in its innermost position with the jaws closed. This locking action takes place, as before stated, immediately after the roller 39 rides up on the cam 38 at the beginning of the stroke of the carrier to the right from the magazine toward the affixing mechanism, and the jaws continue to be thus locked throughout the length of this stroke. But as the limit of the carrier movement in this direction is reached, a pin 46 which projects from a stop head 46$^a$ on the lower ends of both of the guide pins 41, strikes and rides up on a stationary incline 47 (Fig. 8), and gradually lifts the latch 40 until it is raised clear of the lever 25 and leaves the latter free to move back to open the jaws under the pressure of the spring 34. In order to prevent this unlocking of the jaws from occurring too suddenly and with an undesirable noise and jar to the mechanism, a stationary cam lug 48 projects inwardly from the front of the frame in position for contact with the anti-friction roller 39 on the lever 25 just as the latter is released from the latch and before it swings outwardly to any perceptible extent. The inner end 49 of this cam lug then sustains the pressure of the spring 34 during the reversal of the carrier stroke, until, as the carrier starts back on its return stroke, the roller 39 rides down an inclined surface 50 of the cam lug and permits the lever to swing back and the jaws to gradually open, under the pressure of this spring 34, until they reach the limit of movement permitted by a stop pin 51 that projects upwardly through a slot in the lever 25 from the subjacent bracket 27 of the carrier base plate. Obviously in returning to its initial position at the left hand end of the carrier movement, the anti-friction roller 39 must again pass the stationary cam lug 38 by the action of which upon the roller the carrier jaws were closed at the beginning of the right hand stroke, but the cam lug 38 is arranged to be lifted out of the path of the returning roller 39 so that said roller can pass beneath the cam lug without being engaged by the latter during its movement. To this end the cam lug 38 is herein shown as supported at the upper end of a slotted slide 52 which is mounted to move vertically over guide screws 53 on the front of a bracket 54 which projects rearwardly and toward the left from the inner side of the front plate 1 of the frame (Figs. 1 and 7), this slide 52 having at its upper end a forwardly projecting tongue 55 which extends over the top of the bracket 54 and supports the cam lug 38 at the rear of said bracket (Figs. 13, 14 and 15). At its lower end the slide 52 is connected by a wrist pin 56 with a lever arm 57 that is pivoted at the front of the main frame at 58. The body or principal length of the lever 57 lies directly above the path of a stud 59 on the outer or front face of the lever 25 (Fig. 11), and as the carrier moves back from right to left, this stud strikes the under surface of the lever 57, and by raising the lever lifts the slide 52 and with it the cam lug 38, far enough to permit the roller 39 to pass beneath the lug without coming in contact with it. Then just before the carrier reaches the limit of its travel to the left, the stud 59 passes from beneath the end of the lever 57, and permits the cam lug 39 to drop down into the path of movement of the roller 39, ready to deflect the roller and close the jaws again in the next movement of the carrier to the right.

*Automatic stop mechanism.*—As hereinbefore stated a principal feature of my present improvements consists in the provision of means whereby the entire mechanism for supplying and affixing the stamps is automatically thrown out of action whenever the envelops cease to feed, such means being herein shown as constructed as follows:—On its inner or rear side the carrier is provided with a spring pressed lever arm 60 which is pivoted at 61 to a bracket 62 on the adjacent stationary jaw bracket 19ª. This arm extends the entire length of the carrier and is formed at its left hand end with a tongue 63 which is adapted to project forwardly through apertures 64 in the jaws 18 and 20 at the left hand end of the carrier (Figs. 7, 8, and 10). To normally withdraw this tongue from beneath the jaws, a lever 65 is pivoted to a projecting lug 66 on the stationary jaw bracket 19ª (Figs. 7, 8, and 10), and the left hand end 67 of this lever 65 extends in front of a downwardly projecting lug 68 on the arm 60. Its right hand end 69 is slotted to embrace an upstanding pin 70 (Fig. 10) which is secured to the rear end of a rod 71 that extends forward through guide bearings 72 and 73 in the carrier base plate and connects with the lever 25 by a slot and pin connection 74 (Figs. 7 and 11). Then as the lever 25 moves out to open the jaws the lever 65 is oscillated to swing back the arm 60 and retract its tongue 63, from between the jaws 18 and 20. When thus retracted the tongue 63 leaves the jaws free to embrace and close upon the next foremost envelop in the magazine, and the presence between the jaws of the envelop itself will prevent the tongue 63 from passing through the jaws, the apertures 64 being so little larger than the end of the tongue 63 that the stiffness of the envelop and its contents is sufficient to resist the entrance of the tongue. In the normal operation of the machine, therefore, the arm 60 will always be held back in its rearmost position, either by the action of the lever 65 when the jaws are open, or by the presence of the envelop when the jaws are closed. But in case for any reason the jaws fail to close upon an envelop, or in case they fail to hold the envelop but permit it to slip from between them, the tongue 63 will instantly be projected through the jaws and the arm 60 will swing forward into its foremost position. The position of the arm 60 during the right hand or active stroke of the carrier is thus controlled by the fact of the presence or absence of the envelop. And the position of this arm in turn controls the position of a stop head 75 that is adapted to engage and actuate a clutch releasing lever 76. As herein shown this stop head 75 (Figs. 9 and 10) is rigidly secured upon the end of a guide rod 77 which is mounted to slide longitudinally in a rearwardly projecting hollow lug 78 of the carrier bracket 19ª, and this rod is provided between its ends with a pin 79 which projects upwardly through a slot 80 in the top of the lug 78 and engages the rear face of a downwardly projecting finger 81 of the arm 60. A spring 82 stretched between the stop head 75 and the carrier bracket 19ª, tends constantly to draw the head forward and maintain the arm 60 under tension tending to project its tongue 63 through the jaws, but as said arm is normally held back, as hereinbefore described, in the regular operation of the machine, the stop head 75 is also normally held back in its rearmost position against the tension of this spring.

The clutch releasing lever 76 (Fig. 16), is rigidly secured to a rock shaft 83 that is journaled above and a little to the right of the main drive shaft in the ends of brackets 84 that project inwardly from the machine frame to support it (Figs. 1, 3, and 4). The length of the lever 76 is arranged parallel to the direction of movement of the carrier, and consequently to the direction of movement of the stop head 75, the path of which it overlaps to a considerable extent (Fig. 16). And it lies in a plane just in front of the plane of the stop head when the latter is forced back into the position which it occupies in the normal operation of the machine, as hereinbefore described, the planes of the lever and stop head being, however, coincident when the latter is retracted by the swinging forward of the arm 60 in cases where the envelop is absent from between the jaws. Ordinarily, therefore, the reciprocation of the carrier and stop head takes place without disturbing the lever 76, but in case the stop head is permitted to draw back into its inner position by the swinging forward of the lever arm 60 when an envelop fails to feed, the next succeeding movement of the carrier to the right will cause the stop head to pass under the inclined end 85 of the lever and raise it so as to oscillate the rock shaft 83. And this oscillation of the rock shaft throws out the stamp supplying and affixing devices by breaking the driving connection between the drive shaft and the cams 5 and 6 which transmit motion to the stamp supplying and affixing mechanisms. This latter action is accomplished as follows: The cams 5 and 6, as herein shown, are rigidly connected to each other by a common hub 86 which is bored out to receive the drive shaft, but fits loosely thereon. This hub is provided with a clutch dog 87 which is pivoted at 88 between lugs 89 on the hub, and the inner end 90 of this dog projects through an opening in the hub to normally hook over a shoulder 91 on the driving shaft and thus rotate the hub and cams. A spring 92 stretched between a pin 93ª on the rear end of the dog and another pin 93 on the adjacent face of the cam 6 tends to normally maintain the engagement of the dog with the shaft, and to restore such engagement if disconnected. And on the other hand a rocker arm 94, secured on the rock shaft 83 in the same plane with the clutch dog 87, is arranged to come in contact with the outer end of said dog and shift the latter so as to break its engagement with the shaft whenever the rock shaft is oscillated by the contact of the stop head with the lever 76. This rocker arm 94, furthermore, is provided with a hook 95 that is adapted to interlock with a corresponding toe 96 on the end of the clutch dog 87, so that when swung against the dog it will not only disengage it from the rock shaft, but will form a positive stop to instantly limit the further rotation of the cams 5 and 6 until the rocker arm is swung back to release the dog and permit its spring 92 to swing it into renewed engagement with the drive shaft. When the rotation of the cams 5 and 6 is thus checked, the operation of both the stamp carriage and the stamp affixing mechanism will obviously cease and will not be resumed until the clutch dog reëngages the shaft as above stated, to start the cams in rotation again.

The disengagement of the driving mechanism for the stamp carriage and affixing mechanism is designed to be maintained as long as the envelops continue to fail to feed into the carrier, and to this end the lever 76 is provided with a laterally projecting pin 97 (Fig. 16), which, when the lever is raised, hooks over a shoulder 98 on a swinging latch 99 and thus holds the lever up so as to maintain the engagement of the rocker arm 94 with the clutch dog until the latch is retracted. This retraction of the latch does not occur until by the subsequent entrance of an envelop into the jaws, the lever 60 is held back so as to maintain the stop head 75 in its rearmost position, in which it does not engage the lever 76 but does engage the lower end of said latch 99, which is hung just back of the lever on a superjacent pivot 100 (Figs. 1 and 16). When moving toward the affixing mechanism in this rearmost position the stop head will come in contact with the lower end of the latch and swing it back into the position shown in dotted lines in Fig. 16. This will release the lever 76 and permit it to fall; and thereby cause the rocker arm 94 to release the dog 87 and bring about a reengagement of the clutch which drives the stamp carriage and affixing mechanism. After thus releasing the lever 76, the latch 99 will be swung back into its normal position against the pin 97 of the lever, by a spring 101, and to then permit of the return of the stop head 75 past the latch, the lower end of the latter is made in the shape of a swinging pawl 102 which is pivoted to the latch at 103 and is normally held back against a stop pin 104 by a spring 105. This pawl, when the stop head passes by it to the left, simply swings on its pivot to permit the head to pass beneath it without disturbing the latch, and is then returned to its normal position by the spring 105. A stop 106 provided on the latch in front of the pawl, as shown in Fig. 17, serves to prevent it from swinging farther than is necessary to permit the head to pass beneath it.

The driving connections for the stamp carriage and affixing mechanisms are thus automatically broken whenever the envelop supply ceases or the carrier jaws fail to remove an envelop from the magazine, but are thereafter automatically reëstablished as soon as the supply of envelops in the magazine is renewed or as soon as the carrier jaws again begin to seize and withdraw a new envelop with each reciprocation. Furthermore the breaking of these driving connections is also arranged to be accomplished by hand and at the will of the operator, and to this end a sliding bar H is mounted in the machine frame in line with the rocker arm 94 (Figs. 1 and 4). This bar projects out through the side of the machine in the form of a handle $h$, and by pushing it in the rocker arm can be swung into the path of the dog 87 to cause the latter to release its hold on the driving shaft, after the same manner heretofore described in connection with the automatic action and with the same result of throwing the stamp carriage and affixing mechanisms out of operation.

*Stamp affixing mechanism.*—The stamp affixing mechanism here shown is of the same general character as that disclosed in my previous application, No. 715,042, which resulted in Patent No. 870,359, dated November 5, 1907, hereinbefore referred to. That is to say, it comprises a clamp that presses the stamp against the envelop and then moves both the stamp and the envelop bodily away from the sheet of stamps, which is for the time being held stationary, thereby tearing the stamp from the sheet. As in my former application, also, this clamp consists of a reciprocating plunger P and an opposing yielding platen $P^1$ between which and the plunger the stamp is compressed against the envelop. And of these parts the construction only of the platen and its connections forms a part of the present improvement, the plunger and its connections being substantially the same as in said prior application. Thus the plunger P is carried on the front of a plunger frame 451, having a guide bar 452 which is mounted to reciprocate back and forth in a bracket 453 on the machine frame. At its rear end this frame is connected by a wrist pin 107 (Fig. 1) with a lever 108 which is pivoted between its ends 109 to a forwardly projecting lug 110 of the machine frame, and which is provided at its opposite end with a stud or anti-friction roller 111 that enters a groove in a cam 6, so that as said cam revolves the plunger P moves back and forth, one complete reciprocation for each revolution of the cam. The plunger P is also surrounded by a clamp 463 which holds the surrounding portions of the sheet of stamps while the stamp opposite the plunger is being detached, and which is constructed and operated as described in said prior application.

In my former application the platen was projected by a spring released by the envelop carrier, and was retracted by the carrier movement against the pressure of this spring. In the present case the connection between the carrier and platen is entirely done away with and the platen is operated directly from and by the plunger, thus avoiding all possibility of the motion of the plunger and platen being ill-timed with relation to each other, and avoiding the projection of the platen if the affixer is not operating. Thus the platen is mounted at the rear end of a rod 112 which slides back and forth in a bearing 113 of the machine frame. The front end of this rod is connected by a slot and pin connection 114 to the upper end of a bell crank lever 115 which is pivoted to the frame at 116. The other end of this bell crank is connected by a slot and pin connection 117 with a bracket 118 on the end of a vertical rod 119 that is mounted to slide in upper and lower brackets 120 and 121, respectively, of the machine frame. This vertical rod 119 is embraced near its lower end by a loosely sliding collar 122, carried at the front end of a bell crank lever 123, which is pivoted to the machine frame at 124 (Fig. 2), and has its upper rear end connected by a slot and pin connection 125 in the rear end of the plunger frame 451.

The platen is normally maintained under pressure tending to project it by a spring 126 which is stretched between the upper end of the bell crank 115 and a stationary holding screw 127 on the frame. But this pressure is ordinarily resisted by the sliding collar 122, which, in the upward movement of the front end of the bell crank 123, due to the retraction of the plunger frame by the lever 108, rises against a fixed collar 128 on the rod 119 and lifts the rod, thus swinging the bell crank 115 back and retracting the platen against the pressure of the spring 126.

As the plunger P is projected in the operation of the machine, the platen $P^1$ will be projected to meet it by the spring 126 which is permitted to act by the swinging of the lever 123 as the plunger moves out, and the intervening stamp and envelop will thereupon be clamped together between the plunger and platen by the yielding pressure of this spring. The further projection of the clamp to tear the stamp from the sheet will then force back the platen against the yielding pressure of the spring 126, until a spring pressed catch 129 (Fig. 2) swings in beneath the fixed collar 128 on the rod 119 and holds the platen back while the plunger returns. This catch 129 is normally held out of operative position by the presence of the collar 122 in front of it, and as the latter descends with the collar 128 resting upon and following closely after it, the catch simply slides up over both collars without interfering with their movement.
When, however, the platen is pushed back by the plunger it lifts the rod 119 and collar 128 until the latter rises above the catch. The catch then immediately springs in beneath the collar, thus locking the platen in its retracted position and preventing it from following the plunger as the latter is drawn back. The platen then remains locked by the catch 129 until the upward swing of the front end of the lever 123, due to the retraction of the plunger, forces the collar 122 under the collar 128 again and simultaneously presses the catch 129 back out of engagement with said collar 128, leaving the rod 119 free to descend and the platen to move out again to meet the plunger as the latter is projected. A rubber or similar washer 130, inserted on the rod 119 between the collars 122 and 128, serves as a buffer between them to reduce the shock of the contact between them, and this buffer may be notched in line with the catch 129 so as to permit the catch to swing in beneath the collar 128 notwithstanding the presence of the buffer.
The moistening of the face of each envelop preparatory to the application of a stamp is to be accomplished by mechanism shown in my Patent No. 870,359, dated November 5, 1907.

*Sealing mechanism.*—One of the essential improvements of the sealing mechanism shown in the present application consists in the provision of means whereby the envelop is bent centrally outward on its face side by the presser which forces the flap to fold clear down into its intended position against the back of the envelop, even though the contents of the latter are so thick as to normally tend to raise the flap unduly. To accomplish this action the envelop is delivered by the carrier between upper and lower guide plates 150 and 151, of which the latter is flush with and may constitute part of the table of the sealer. These guide plates are then provided with opposed inwardly projecting shoulders 152, the distance between which is less than the width of the envelop for which the machine is set. The front corners of these shoulders 152 are preferably rounded off to permit the edges of the envelops to readily pass by them, but their rear faces are notched at 153 so as to catch the edges of the envelop after they have once reached this position.

The forcing of the envelops between the shoulders 152 is accomplished by a reciprocating pressure plate 154 which, in this instance, is carried by a cross head 155 that slides on fixed guide rods 156 of the frame (Fig. 6). This cross head is connected by a link 157 to the upper end of a vibratory lever 158, the lower end of which is pivoted to a fixed lug 159 of the frame. A stud 160 is provided on this lever between its ends and projects into the groove in the periphery of the cam 7 on the crank shaft 2, so that the lever will be vibrated and the presser plate 154 reciprocated once in each revolution of the crank shaft.

The envelop E is delivered between the guide plates 151 by the carrier when the presser plate 154 is retracted. The face of the envelop is turned away from the presser plate, while its partially closed flap inclines downwardly toward the plate, after some such manner as is shown in Fig. 6. The bending of the flap down this far is accomplished by a flap turning plate 161 placed just inside of the sealer along the path of the envelops. This flap turner is herein shown as secured to the top plate 150 of the sealer by screws 162 (Fig. 5). It consists of a horizontal top plate provided at its left hand end with an upturned lip 163 (Fig. 3), and made wider at this end and provided with a downwardly extening vertical flange 164 which slants back toward the die plate as it approaches the sealer. When the envelop reaches the flap turner in the movement of the carrier toward the sealing mechanism, its flap is in the same substantially horizontal position which it occupies in the magazine, or if sprung up the lip 163 serves to depress it into this horizontal position. Then as the envelop passes beneath the turning plate, the edge of its flap strikes the edge of the flange 164 and is thereby gradually turned down until the envelop emerges into the sealer with its flap folded as closely against the body of the envelop as the thickness of its contents will permit.

Immediately the envelop enters the sealer the presser plate 154 is advanced and strikes the point of the downwardly inclined flap and gradually closes it down against the body of the envelop. The advance of the presser plate also causes the envelop to bow or belly outwardly away from the plate as it is pushed between the shoulders 152 which restrain its top and bottom edges. This bending of the envelop takes place just at the right time to permit the point of the flap to slide down the plate, which is preferably inclined backward slightly, until it reaches a substantially vertical position before the actual adhesion between the flap and bottom of the envelop begins, and the result is that the envelop is fully closed and the flap properly sealed, even though the contents of the envelop are of considerable thickness.

The presser plate 154 is narrow enough vertically to pass freely between the shoulders 152 and eventually forces the envelop through these shoulders against the resistance of two yielding wings or gates 165 (Fig. 5). These gates are pivotally mounted on studs 166 located at each side of the sealer table, being secured to sleeves 167 which rotate freely on these studs. The lower ends of these sleeves serve as drums around which rubber bands 168 may be coiled, and these bands are carried back and adjustably secured by screw bolts 169 to lugs 170 on the table. Said bands are stretched to a suitable degree of tension and serve to swing the gates 165 in against the envelops and then hold them compressed against the presser plate or the notched faces 153 of the shoulders 152. Then as the envelops accumulate the straps yield and permit the gates to open gradually until the envelops pass out beyond them. The vertical distance between the faces of the top and bottom plates 150 and 151 of the sealer back of the shoulders 152 is desirably made less that the height of the envelops so that the bowed position of each envelop is maintained until it is pushed through beyond the top plate 150, thus giving the mucilage on the flap a chance to dry before the natural straightening of the envelop when released from restraint can put strain enough upon the flap to break the seal. This vertical distance and the distance between the shoulder 152 may be adjusted to suit different widths of envelops by raising or lowering the top plate 150 by means of thumb screws 171 on a stud 172 at the outer edge of the sealer table, by which the top plate is supported.

The moistening of the envelop flaps is herein shown as accomplished by a roller 175 located just to the left of the stamp affixing platen. This roller is revolubly mounted in a tank 176, and it is contemplated that the lower portion of the roller shall dip continuously in the water in the tank and that the roller shall be rotated fast enough to keep its upper portion, which projects out of the water, just wet enough to properly moisten the flap. To this end a ratchet wheel 177 is secured on the end of the roller shaft, and a ratchet arm 178 is pivotally mounted on the shaft to carry a ratchet pawl 179. The outer end of this arm is connected by a link 180 with the lever 57 of the carrier mechanism and is thus caused to oscillate once with each movement of the carrier. Every oscillation of the lever 178 will then cause the pawl 179 to engage and slightly rotate the ratchet wheel and roller, and the latter will thus be kept constantly moistened. A stop pawl 181 serves to hold the roller against reverse rotation when the pawl is retracted by the return movement of the arm.

The envelop sealing mechanism shown and described but not claimed herein forms the subject-matter of a divisional application filed May 20, 1911, Serial No. 628,438 for machines for sealing mail matter.

I claim as my invention:

1. In a machine of the class described, a carrier mechanism, containing jaws for clamping the envelop, means for closing the jaws during the beginning of the forward stroke and for opening the jaws during the first part of the return stroke, substantially as described.

2. In a machine of the class described, a reciprocating carrier provided with a plurality of separate clamping means for individually clamping and transferring envelops of different thicknesses at the same time, substantially as described.

3. The combination of a support adapted to receive a plurality of envelops, means for feeding said envelops, a stamp feeding mechanism adapted to feed a stamp to a point in position to be affixed to an envelop and to hold it until an envelop be fed forward to receive said stamp, and means controlled by the presence of an envelop in the feeding means for operating the stamp feeding mechanism.

4. In a machine for sealing and stamping envelops or the like, means for feeding the envelops, means for moistening them, means for affixing a stamp thereto, means for bunching or stacking the envelops under pressure, and means for automatically releasing said pressure as the envelops accumulate in the stacker, substantially as described.

5. In a machine of the class described, a stamp feed and affixing mechanism, a reciprocating carrier for feeding the envelops to the affixer mechanism and means located on said carrier for throwing out the stamp feed and affixing mechanism when there is no envelop in said carrier, substantially as described.

6. In a machine of the class described, a stamp feed and affixing mechanism, a reciprocating carrier for feeding the envelops to the affixer mechanism, and means located on said carrier for causing the stopping of the stamp feed and affixing mechanism when there is no envelop in the carrier and for causing the starting of the stamp feed and affixer mechanism whenever an envelop is clamped by the carrier.

7. In a machine of the class described, a stamp-feed and affixing mechanism, a carrier for feeding the envelops, and means moving with the carrier for causing the starting of the stamp-feed and affixing mechanism whenever an envelop is carried by the carrier, and for causing the stopping of the stamp-feed and affixing mechanism whenever no envelop is carried by the carrier, substantially as described.

8. In a machine of the class described, a stamp-feed and affixing mechanism, a carrier for feeding the envelops and means moving with the carrier for causing the stopping of the stamp-feed whenever no envelop is carried by the carrier, substantially as described.

9. In a machine of the class described, a stamp-feed and affixing mechanism, a carrier for feeding the envelops and means moving with the carrier for causing the stopping and preventing the actuation of the stamp-feed and affixing mechanism whenever no envelop is carried by the carrier, substantially as described.

10. In a machine of the class described, a stamp-feed and affixing mechanism, a carrier for feeding the envelops and means moving with the carrier for causing the actuation of the stamp-feed and affixer mechanism only when an envelop is carried by the carrier, substantially as described.

11. In a machine for affixing postage stamps to envelops, an affixing mechanism, a carrier for carrying the envelops to the affixing mechanism, and means moving with the carrier for causing the actuation of the affixing mechanism only when an envelop is being carried by the carrier, substantially as described.

12. In a machine for affixing postage stamps to envelops, a stamp-feed and affixing mechanism, a carrier clamp for carrying the envelops, and means in the clamp for causing the starting of the stamp-feed and affixing mechanism whenever an envelop is in the clamp, and for causing the stopping of said stamp-feed and affixing mechanism whenever no envelop is in the clamp, substantially as described.

13. In a machine of the class described, a stamp-feed and affixing mechanism, a carrier-clamp for carrying the envelops, and means in said clamp for causing the starting of the stamp-feed and affixing mechanism whenever said clamp closes on an envelop, and for causing the stopping thereof whenever said clamp closes without clamping an envelop, substantially as described.

14. In a machine for affixing stamps to mail matter, a magazine for holding several sheets containing a plurality of individual stamps, an affixing mechanism, means for feeding the individual stamps in each and every sheet in succession to the affixing mechanism, and means for actuating said feeder and affixing mechanism only when matter to be stamped is fed to the affixing mechanism, substantially as described.

15. In a machine for affixing stamps to mail matter, means for holding a sheet containing several rows of individual stamps, an affixing mechanism, means for feeding the individual stamps in each and every row in succession to the affixing mechanism, and means for actuating the affixing mechanism only when matter to be stamped is fed to the affixing mechanism, substantially as described.

16. In a machine for affixing stamps to mail matter, means for holding a sheet containing a plurality of individual stamps, an affixing mechanism, means for feeding the individual stamps in the sheet in succession to the affixing mechanism, and means for actuating the affixing mechanism only when matter to be stamped is fed to the affixing mechanism, substantially as described.

17. In a machine for affixing stamps to mail matter, means for holding a sheet containing a plurality of individual stamps, an affixing mechanism, means for feeding the individual stamps in the sheet in succession to the affixing mechanism, and means for actuating the feeding means only when matter to be stamped is fed to the affixing mechanism, substantially as described.

18. In a machine for affixing stamps to mail matter, means for holding a sheet containing a plurality of individual stamps, an affixing mechanism, means for feeding the individual stamps in the sheet in succession to the affixing mechanism, means for feeding mail matter to the affixing mechanism, and means for actuating the stamp-feed only when mail matter is being fed to the affixing mechanism, substantially as described.

19. In a machine for affixing stamps to mail matter, means for holding a sheet containing a plurality of individual stamps, an affixing mechanism, means for feeding the individual stamps in the sheet in succession to the affixing mechanism, means for feeding mail matter to the affixing mechanism, and means for automatically stopping the stamp feeding means and affixing mechanism whenever mail matter ceases to be fed to the affixing mechanism, substantially as described.

20. In a machine of the class described, a stamp affixing mechanism, a carrier for feeding the envelops to the affixer mechanism and means located on said carrier for stopping the action of the affixer mechanism when there is no envelop in said carrier, substantially as described.

21. In a machine for affixing stamps to mail matter, means for holding a sheet containing a plurality of individual stamps, an affixing mechanism, means for feeding the individual stamp in the sheet in succession to the affixing mechanism, and means for actuating the stamp-feed and affixing mechanism only when matter to be stamped is fed to the affixing mechanism, substantially as described.

22. In a machine for stamping envelops, the combination with stamp-affixing and stamp-feeding mechanisms normally at rest, of means for feeding envelops to the affixing mechanism, and means engaging against the flat face of the envelops for causing the actuation of the stamp-affixing and stamp-feeding mechanisms whenever an envelop is fed to the affixing mechanism.

23. In a machine for stamping envelops, the combination with a stamp-affixing mechanism normally at rest, of means for feeding envelops to the affixing mechanism, and means engaging against the flat face of the envelops for causing the actuation of the stamp-affixing mechanism whenever an envelop is fed to the affixing mechanism.

24. In a machine for stamping envelops or the like, the combination with a stamp-affixing mechanism, of means for feeding envelops to said affixing mechanism, means for operating the affixing mechanism, connections between the affixer-operator and the envelop feeding means by which the affixer is operated when said connection is made and stopped when said connection is broken, positively operated means for breaking said connection, and means held out of operation by the envelop and causing the positive operation of the breaking means to break said connection when no envelop is being fed, substantially as described.

25. In a machine for affixing stamps to envelops or the like, the combination with a stamp-affixing mechanism, means for feeding stamps to the affixing mechanism, means for feeding envelops to the affixing-mechanism, means for operating the stamp-affixing mechanism and the stamp-feeding means, connections between said operating means and the envelop-feeding means by which the affixer and stamp-feed are operated when said connection is made and stopped when said connection is broken, positively operated means for breaking said connection, and means held out of operation by the envelop and causing the positive operation of the breaking means to break said connection when no envelop is being fed, substantially as described.

26. In a machine for affixing postage-stamps to envelops or the like, the combination with a stamp affixing mechanism, of means for feeding stamps to the affixing mechanism, means for feeding envelops to the affixing mechanism, means for operating the stamp-feeding means, connections between the stamp-feed operating means and the envelop-feeding means by which the stamp-feed is operated when said connection is made and stopped when said connection is broken, positively operated means for breaking said connection, and means held out of operation by the envelop and causing the positive operation of the breaking means to break said connection when no envelop is being fed, substantially as described.

27. In a machine for affixing postage-stamps to envelops, the combination with a stamp-affixing mechanism, of means for feeding envelops to said affixing mechanism, means for operating the affixing mechanism, connection between the affixer-operator and the envelop-feeding means by which the affixer is operated when said connection is made and stopped when said connection is broken, positively operated means for breaking said connection, and means adapted to engage against the flat surface of the envelop and to be held out of operation thereby, said means causing the positive operation of the breaking means to break said connection when no envelop is being fed, substantially as described.

28. In a sealing and stamping machine, the combination of envelop moistening and sealing mechanism, a stamp carrier, and mechanism to affix a stamp to each advancing envelop, said stamp affixing mechanism automatically operated by the advancing envelop.

29. The combination with an envelop feeding device and means for automatically affixing stamps to envelops so fed, of intermediate positively operating mechanism for throwing the stamp affixing means out of operation upon the failure of an envelop to be fed by said feeding device.

30. In an envelop sealing and stamping machine, the combination of an envelop moistening and sealing mechanism, means for feeding the envelops through the machine, stamp affixing mechanism automatically controlled by the advancing envelops, and moistening means coöperating therewith.

31. In a machine for affixing stamps to envelops or the like the combination of a power shaft, stamp-affixing mechanism, including a stamp holder, means for feeding stamps therefrom, and a moistener, means for feeding envelops to the stamp-affixing mechanism connected to the power-shaft and operated thereby, connections between the power-shaft and the stamp-affixing mechanism, a make-and-break device in said connections, and means operated by an envelop fed by the said envelop-feeding means for controlling said make-and-break device to connect the power-shaft in driving relation to the stamp-affixing mechanism when an envelop is fed thereto, substantially as described.

32. The combination of stamp-affixing mechanism, a support for a pile of envelops, means for feeding envelops therefrom, a feeler, and operating devices for reciprocating the feeler, to carry it into coaction with the envelops, said feeler being free to have its movement arrested by an envelop and the engagement of said feeler with an envelop controlling the operation of said stamp-affixing mechanism.

33. The combination of stamp-affixing mechanism, a support for a pile of envelops, means for feeding envelops therefrom, a feeler, means for operating the same in coaction with an envelop so that the envelop limits the movement of the feeler, and means for making the operation of said mechanism dependent upon the operation of said feeler.

34. The combination of means for forwarding envelops, stamp-affixing mechanism, a feeler, means for operating the feeler in the path of the envelops forwarded by said means, said feeler being adapted to have its movement checked by the envelops, and means for making the operation of said mechanism dependent upon the said feeler.

35. The combination of a support for a pile of envelops, means for feeding envelops therefrom successively, mechanism for feeding stamps successively from sheets consisting of a plurality of rows of stamps and a plurality of stamps in each row, and means for controlling the operation of said stamp-feeding mechanism dependent upon the presence of an envelop in position for receiving a stamp.

36. The combination of a support for a pile of envelops, means for automatically feeding envelops therefrom successively, mechanism for feeding stamps successively from sheets consisting of a plurality of rows of stamps and a plurality of stamps in each row, means dependent upon the envelops for controlling the operation of said stamp-feeding mechanism, and means for affixing the stamps to the envelops.

37. The combination of a support for a pile of envelops, means for turning the flaps of the envelops successively, automatic feeding and forwarding devices for the envelops, mechanism for feeding stamps successively from sheets consisting of a plurality of rows of stamps and a plurality of stamps in each row, devices dependent upon the envelops for controlling the operation of the stamp-feeding mechanism, and means for affixing stamps to the envelops.

38. The combination of a support for a pile of envelops, means for feeding envelops therefrom successively, a feeler adapted to coact with the envelops, means for reciprocating the feeler and permitting the movement thereof to be restricted by an envelop, stamp-feeding mechanism, and means for controlling the operation of said mechanism dependent upon the extent of movement of said feeler.

39. The combination of means for feeding stamps successively from sheets consisting of a plurality of rows of stamps and a plurality of stamps in each row, means for forwarding envelops successively, a feeler, means for operating the same, said feeler being adapted to have its movement checked by the envelops, and means for making a portion of the stamp-feeding mechanism dependent upon said feeler.

40. The combination of a frame, a stamp affixing mechanism in said frame; mechanism for feeding envelops singly and in succession to said stamp affixing mechanism; said stamp affixing mechanism being normally inactive during the continuous operation of said feeding mechanism; trip mechanism for controlling the operation of said stamp affixing mechanism; said trip mechanism having a part movable across the path of the envelop and adapted when it engages an envelop to cause said affixing mechanism to operate.

41. The combination of a support for a pile of envelops, means for feeding envelops therefrom successively, mechanism for feeding stamps successively, and means for controlling the operation of said stamp feeding mechanism dependent upon the presence of an envelop in position for receiving a stamp.

42. The combination of a support for a pile of envelops, means for feeding envelops therefrom successively, mechanism for feeding stamps successively into position to be affixed to envelops, stamp affixing means, means for controlling the operation of the stamp feeding and affixing means dependent upon the presence of an envelop in position for sealing a stamp.

43. In combination with stamp-affixing mechanism, a support for a pile of envelops, means for feeding envelops from said support, a moistener for the envelop flaps, sealing devices for sealing the envelops, a feeler adapted to coact with the envelops, and means for reciprocating the same, the engagement of said feeler with an envelop controlling the operation of said stamp-affixing mechanism, substantially as described.

44. In combination with a support for a pile of envelops, means for automatically feeding envelops therefrom successively, mechanism for feeding stamps successively from sheets consisting of a plurality of rows of stamps and a plurality of stamps in each row, means dependent upon the envelop for controlling the operation of said stamp-feeding mechanism, and means for affixing the stamps to the envelops, substantially as described.

45. The combination with an envelop feeding device, means for automatically affixing stamps to envelops so fed, means movable with the feeding means and automatically controlled by the advancing envelop to control the stamp affixing means.

46. The combination with an envelop feeding means, means for automatically affixing stamps to envelops so fed, of mechanism movable with the envelop feeding means for throwing the stamp feeding and affixing means out of operation upon the failure of an envelop to be fed by said feeding device.

47. The combination with means for feeding envelops, a flap moistening means, a stamp feeding and affixing means, a sealing and stacking means, and mechanism controlled by the passing envelops to hold the stamp feeding means operative while the envelops are passing, and to render it inoperative upon the failure of an envelop to feed.

48. A sealing and stamping machine comprising an envelop feeding means, means for affixing stamps to the envelops so fed, means movable with the envelop feeding means and adapted to engage the envelops before they reach the stamping mechanism to render said stamp affixing mechanism operative when an envelop is present in the feeding means, and to render said mechanism inoperative when an envelop is not present in the feeding means.

49. An envelop sealing and stamping machine comprising means for feeding envelops, means for moistening and sealing the flaps thereof, means for feeding and affixing stamps thereto, and means for automatically stopping the stamp feeding means.

50. The combination with means for holding a plurality of envelops, means for feeding envelops from said holding means, a stamp feeding means arranged to feed a stamp into position to be affixed to an envelop, means to assure the retention of said stamp at such a point until an envelop be forwarded to receive it, and a stamp affixing mechanism controlled by an envelop moving to the stamp affixing point and before said envelop reaches said affixing point.

51. An envelop sealing and stamping machine comprising means for feeding envelops, means for moistening and sealing the flaps thereof, means for feeding and affixing stamps thereto, and means adapted to engage the envelops before they reach the stamping mechanism to render said stamp affixing mechanism operative when an envelop is present in the feeding means and to render said stamp affixing mechanism inoperative when an envelop is not present in the feeding means.

52. The combination with means for holding a plurality of envelops, means for feeding envelops from said holding means, a stamp feeding mechanism arranged to feed a stamp to a certain point at one side of the travel of the envelop, a stamp affixing mechanism, and means controlled by the passing envelop to assure the retention of the stamp at the affixing point if an envelop is not fed to said point, said means also, under the same conditions rendering the stamp affixing mechanism inoperative.

53. The combination with means for holding a plurality of envelops, means for feeding envelops from said holding means, a flap moistening means, a stamp feeding means arranged to feed a stamp to a certain point at one side of the travel of the envelop, a stamp affixing mechanism, a stacking means, means independent of the feeding means for assuring the retention of the stamp at the affixing point when no envelop is fed to receive the stamp, said means under like conditions rendering the stamp affixing means inoperative.

54. The combination of means of feeding envelops, a stamp feeding means, a stamp affixing means, a controller for said stamp feeding and affixing mechanisms arranged to move across the path of the envelops when no envelop is in the feeding means and to thereby render the stamp feeding and affixing mechanisms inoperative.

55. The combination of an envelop feeding means, a feeler adapted to co-act with the envelops, means for reciprocating the feeler and permitting the movement thereof to be restricted by an envelop, a stamp feeding means, a stamp affixing mechanism, and means for controlling the operation of the stamp feeding and stamp affixing mechanisms dependent upon the extent of movement of said feeler.

56. The combination with an envelop feeding device and means for automatically affixing stamps to envelops so fed, of intermediate mechanism for throwing the stamp affixing means out of operation upon the failure of an envelop to be fed by said feeding device and including a feeler controlling the said intermediate mechanism.

57. The combination with means for holding a plurality of envelops, means for feeding envelops from said holding means, a stamp feeding means arranged to feed a stamp into position to be affixed to an envelop, means to assure the retention of said stamp at such point until an envelop be forwarded to receive it, a stamp affixing mechanism, and means adapted to engage the flap side of an envelop to render the stamp affixing mechanism operative.

58. The combination with means for holding a plurality of envelops, means for feeding envelops from said holding means, a stamp feeding means arranged to feed a stamp into position to be affixed to an envelop, means to assure the retention of said stamp at such point until an envelop be forwarded to receive it, a stamp affixing mechanism, and a device adapted to move across the path of the envelop and to render the stamp affixing mechanism operative if an envelop be present in said path and to render the stamp affixing mechanism inoperative when an envelop is not present in said envelop path.

59. The combination with means for holding a plurality of envelops, means for feeding envelops from said holding means, a stamp feeding means arranged to feed a stamp into position to be affixed to an envelop, means to assure the retention of said stamp at such point until an envelop be forwarded to receive it, a stamp affixing mechanism, and a clutch operating mechanism controlled by the passing envelop and adapted to render the stamp affixing means operative when an envelop is fed into position to receive a stamp.

60. The combination with means for holding a plurality of envelops, means for feeding envelops from said holding means, a stamp feeding means arranged to feed a stamp into position to be affixed to an envelop, means to assure the retention of said stamp at such point until an envelop be forwarded to receive it, a stamp affixing mechanism, and operating mechanism controlled by the passing envelop and adapted to render the stamp affixing means operative when an envelop is fed into position to receive a stamp.

In testimony, that I claim the foregoing as my invention, I affix my signature in presence of two subscribing witnesses, this 14th day of May, A. D. 1903.

LOUIS J. HALL.

Witnesses:
HENRY W. CARTER,
K. A. COSTELLO.